United States Patent [19]

Kihara

[11] Patent Number: 5,386,303
[45] Date of Patent: Jan. 31, 1995

[54] FACSIMILE APPARATUS WITH CODE MARK RECOGNITION

[75] Inventor: Osamu Kihara, Kyoto, Japan

[73] Assignee: Rohm Co., Ltd., Kyoto, Japan

[21] Appl. No.: 974,949

[22] Filed: Nov. 12, 1992

[30] Foreign Application Priority Data

Dec. 11, 1991 [JP] Japan ................ 3-327220

[51] Int. Cl.⁶ .............................................. H04N 1/00
[52] U.S. Cl. ........................................ 358/453; 358/405
[58] Field of Search ............... 358/400, 403, 407, 405, 358/437, 440, 450, 452, 467, 444; 379/100; H04N 1/00

[56] References Cited

U.S. PATENT DOCUMENTS

| | | | |
|---|---|---|---|
| 5,130,818 | 7/1992 | Tadokoro | 379/100 |
| 5,153,737 | 10/1992 | Kobayashi | 358/452 |
| 5,155,601 | 10/1992 | Toyama | 358/407 |
| 5,159,630 | 10/1992 | Tseng et al. | 379/100 |
| 5,258,998 | 11/1993 | Koride | 358/434 |

FOREIGN PATENT DOCUMENTS 61-13862 1/1986 Japan.
4-172859 6/1992 Japan.

Primary Examiner—Edward L. Coles, Sr.
Assistant Examiner—Kim Yen Vu
Attorney, Agent, or Firm—Brumbaugh, Graves, Donohue & Raynond

[57] ABSTRACT

A mark indicating strictly confidential information is given in a predetermined portion of a manuscript to be transmitted. When the mark is read and the received manuscript is judged to be strictly confidential information at a receiving party (ST41), the received manuscript data is stored in a memory (ST42). When a password is entered, the data stored in the memory is then printed out (ST44) only if the entered password matches a registered password (ST43). Whereby, the strictly confidential documents is transmitted in safety.

2 Claims, 3 Drawing Sheets

FACSIMILE APPARATUS WITH CODE MARK RECOGNITION

BACKGROUND OF THE INVENTION

1. Field of the Invention

This invention relates to a facsimile apparatus which reads the contents of a manuscript, etc., and transmits them as image information to a receiving party which then reproduces the contents.

2. Description of Conventional Art

A conventional facsimile (FAX) generally well known, after it is placed in the speech (communication) state, reads a setup manuscript by an image sensor and transmits it to the associated party; the called facsimile at the receiving party immediately prints out the manuscript by a printer. If paper is out, some facsimiles temporarily store received manuscript data in memory, and when new paper is set, starts printing out the manuscript data stored in the memory.

With the conventional facsimiles, when a manuscript transmitted, the associated facsimile which receives it immediately prints out the manuscript, thus a strictly confidential document cannot be sent with the conventional facsimiles or even if an attempt is made to send it with the conventional facsimiles, cumbersome steps are required such that the strictly confidential document should be sent to a facsimile in a room where secrecy is maintained and that a specific person should copy the document from the facsimile and distribute the copies to other specific persons in the house.

SUMMARY OF THE INVENTION

Accordingly, it is one object of the invention to provide a facsimile which enables safe and secure transmission confidential documents.

It is another object of the invention to provide a facsimile which can transmit the received contents to an in-house terminal device selectively and automatically.

According to first aspect of the invention, there is provided a facsimile apparatus which comprises first means for judging whether or not a predetermined pattern or character is given in a predetermined area of received manuscript data, second means for judging whether or not the manuscript data is strictly confidential information when the predetermined pattern or character is recognized with the first means, third means for storing the manuscript data in a memory when the manuscript data is judged to be strictly confidential information with the second means, and then for instructing the manuscript data stored in the memory to be printed only if a predetermined password code is entered, and fourth means for executing normal printing when the predetermined pattern or character is not recognized with the first means.

When receiving manuscript data from a transmitting party, the facsimile judges whether or not a predetermined pattern or character is given in a specific area of the manuscript. If the predetermined pattern or character is detected, the facsimile handles the manuscript data as a strictly confidential document, and stores it in a memory. Then, the manuscript data stored in the memory is printed out only if a predetermined password is entered at the receiving party. Thus, only the person granted the password can know the manuscript and secrecy can be observed.

According to another aspect of the invention, there is provided a facsimile to which a plurality of in-house terminal devices each having at least output means of print means and/or display means are connected and which comprises means for judging whether or not a predetermined pattern or character is given in a predetermined area of received manuscript data and means responsive to the type of the predetermined pattern or character for sending an output command together with the manuscript data to one or more of the plurality of in-house terminal devices.

When receiving manuscript data from a transmitting party, the facsimile judges whether or not a predetermined pattern or character is given in a specific area of the manuscript data. If the predetermined pattern or character is detected, the facsimile sends an output command together with the manuscript data to one or more predetermined in-house terminal devices in response to the character or pattern type. When receiving the manuscript data, the in-house terminal device or devices print it out.

According to the present invention, since the operation of the receiving party is carried out in accordance with the predetermined pattern or character in a specific area of the document, the conventional facsimile generally known can be used as a transmitting party.

PREFERRED EMBODIMENT OF THE PRESENT INVENTION

Referring now to the accompanying drawings, there are shown preferred embodiments of the invention.

Figure 1:
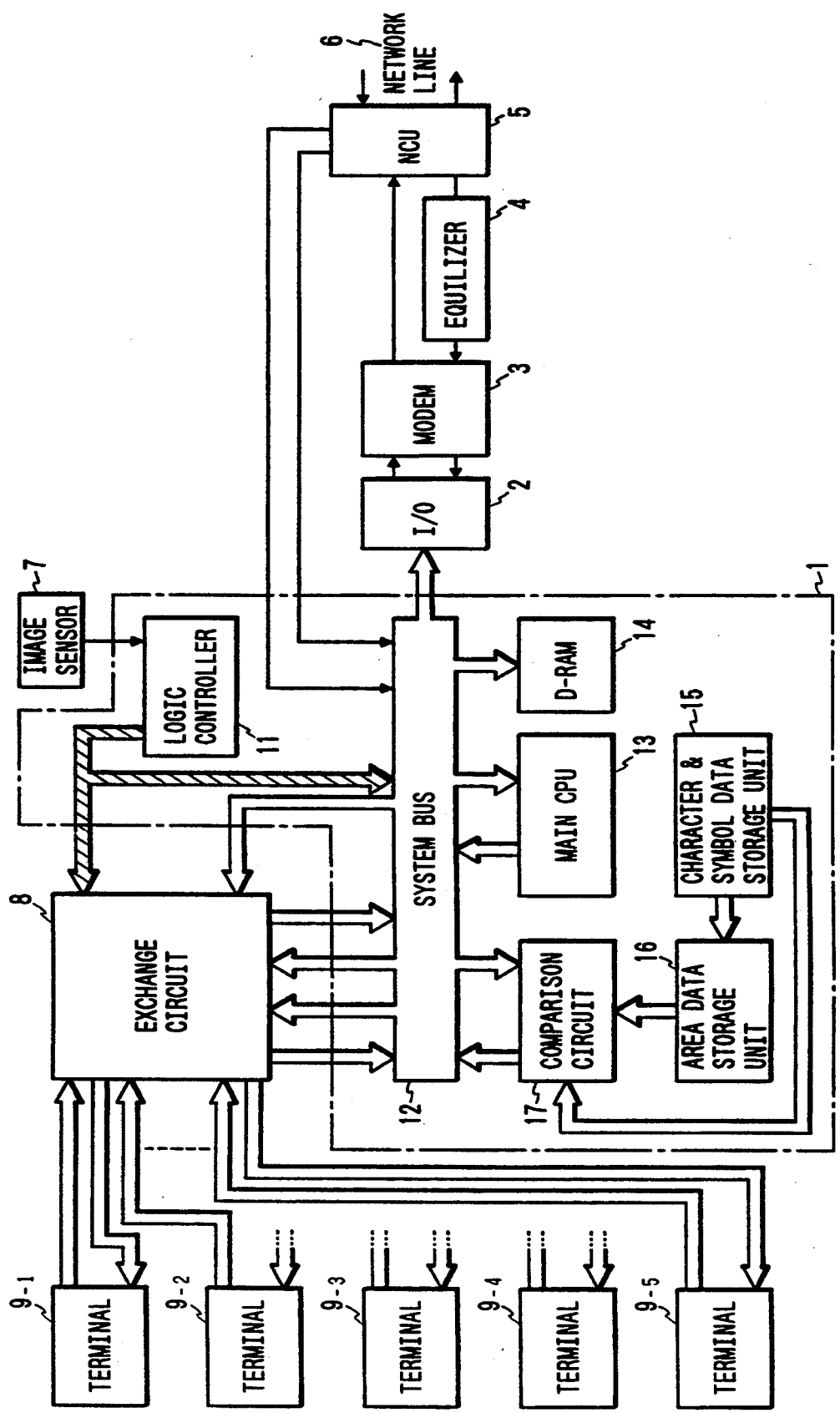
FIG. 1 is a circuit block diagram of a facsimile system showing one embodiment of the invention.

FIG. 1 is a circuit block diagram of a facsimile system showing one embodiment of the invention, wherein a signal control unit 1 is connected via an I/O port 2, a modem 3, an equalizer 4, and a network control unit (NCU) 5 to a network line 6 for transferring manuscript data to and from the associated party.

The signal control unit 1 has a logic controller 11, a system bus 12, a main central processing unit (CPU) 13, a dynamic random access memory (DRAM) 14, a character and symbol data storage block 15, an area data storage block 16, and a comparison circuit 17. Control signals are sent from the logic controller 11 to an image sensor 7 for reading read data. The signal control unit 1 is connected via an exchange circuit 8 to a plurality of terminal devices 9-1 to 9-5.

Figure 4:
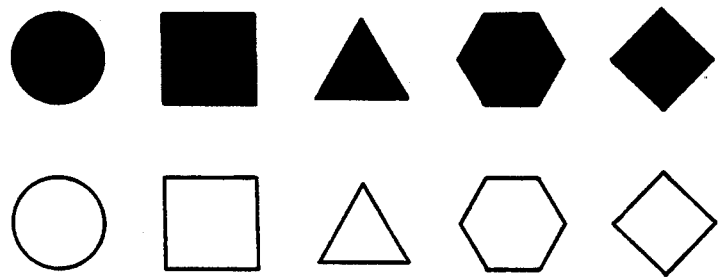
FIG. 4 shows examples of the pattern provided in a specific area of the document.

In the facsimile apparatus, recognition marks made up of characters or patterns, such as a circle, rectangle, triangle, and hexagon shown in FIG. 4, are prestored in the character and symbol storage block 15 of the signal control unit 1, and predetermined area data such as the leading 1–1.5 cm or the trailing 1–1.5 cm of the manuscript to be transmitted is prestored in the area data storage block 16o When receiving manuscript data from a transmitting party, the signal control unit 1 can judge whether or not the data in a specific area of the manuscript data matching the area stored in the area data storage block 16 matches any one of the recognition marks stored in the character and symbol data storage block 15 by means of the comparison circuit 17.

Figure 2:
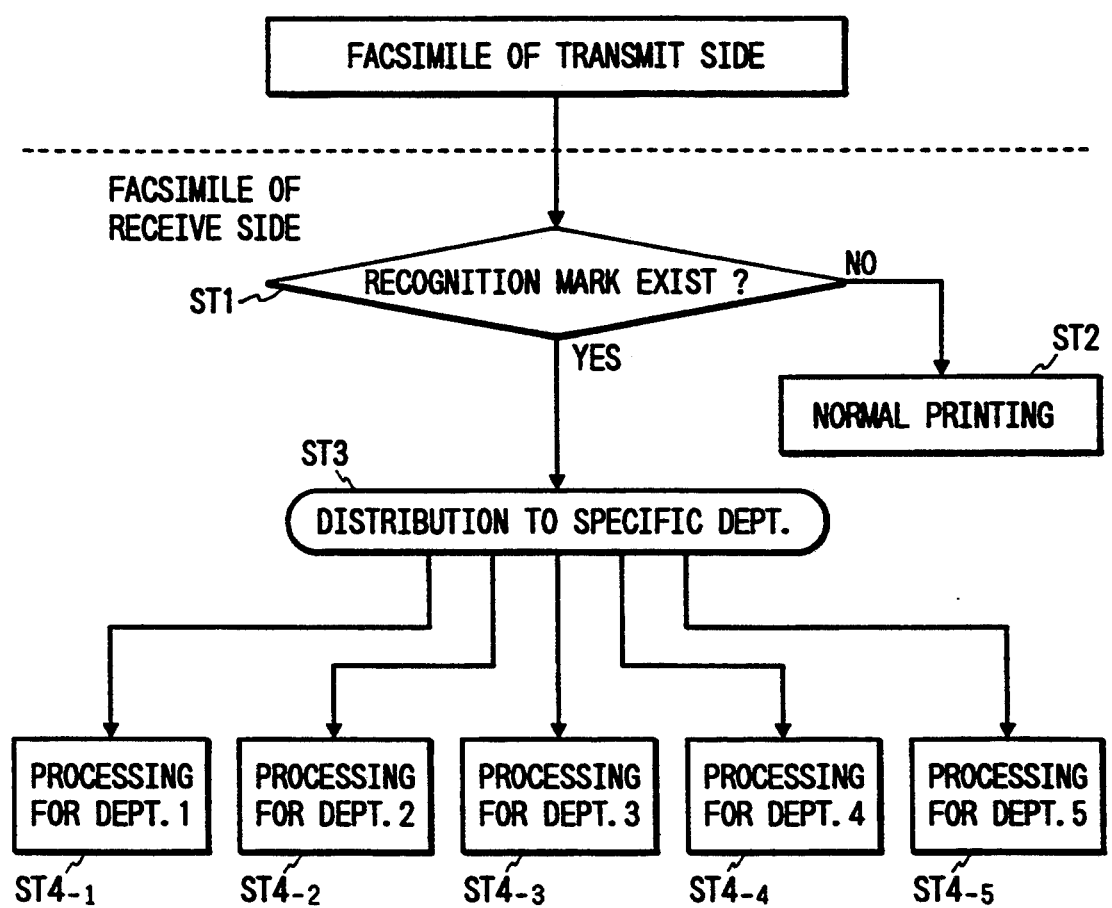
FIG. 2 is a flowchart for illustrating reception operation of the facsimile system of the embodiment.
Figure 3:
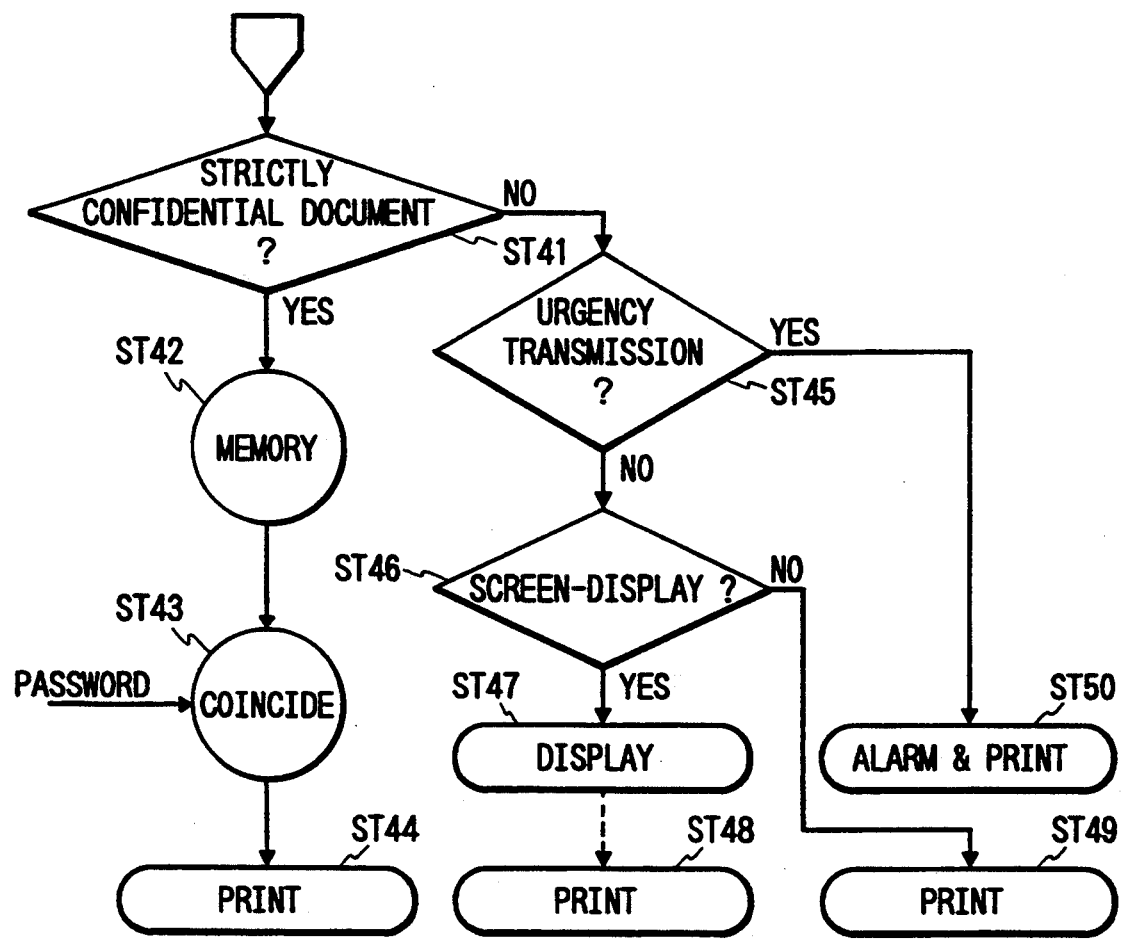
FIG. 3 is a flowchart for illustrating reception operation of the facsimile system of the embodiment for each terminal device installed at each department.

Reception operation of the facsimile system is described in conjunction with flowcharts shown in FIGS. 2 and 3.

First, when receiving a signal from a facsimile of a transmitting party, the receiving facsimile starts checking the received manuscript area corresponding to the area stored the area data storage block 16 by the comparison circuit 17 see if any of the recognition marks stored in the character and symbol data storage block 15 is found (step ST1). If no recognition marks are found, the facsimile judges the received data to be normal facsimile information and performs normal printing by a printer thereof (not shown) (step ST2).

In step ST1, if any of the predetermined recognition marks is found in the predetermined area of the received manuscript, the facsimile selects the destination of the manuscript among departments 1 to 5 according to the type of recognition mark (step ST3). The terminal devices 9-1 to 9-5 shown in FIG. 1 are installed in the departments 1 to 5 respectively. Each of the terminal devices 9-1 to 9-5 in the departments is provided with a printer, display, key input section, etc. After the destination is determined, processing is performed for each selected department (steps ST4-1 to ST4-5).

Processing for each department is described in detail in conjunction with FIG. 3. The same processing routine is applied to the departments. Since the predetermined mark is detected, whether or not the recognition mark indicates strictly confidential document is judged (step 41). If a strictly confidential document is indicated, the manuscript data is stored in memory (step ST42) and a wait is made for a password to be entered through the key input section. If a password is entered and matches the registered password (step ST43), then print operation is performed (step ST44). If the manuscript data is transmitted to the terminal device at the department, it is not immediately printed out and is printed out only if the registered password is entered, thus secrecy can be maintained.

If a strictly confidential document is not indicated in step ST41, then whether or not the recognition mark indicates urgency transmission is judged (step ST46). If urgency transmission is not indicated, whether or not screen display is specified is judged (step ST46). If screen display is required, the received manuscript data is displayed on the display section of the terminal device (step ST47) and is also printed out (step ST48). If screen display is not required, the manuscript data is only printed out (step ST49).

If the recognition mark indicates urgency transmission in step ST45, in order to inform the persons around the terminal device that manuscript data is received, an alarm sound is produced and the manuscript data is printed out (step ST50).

According to one aspect of the invention, when a manuscript to which a predetermined mark is given is received, the manuscript data is stored in a memory, and then is printed out only if a predetermined password is entered. Thus, important and confidential documents which can be sent only in sealed covers hitherto can also be sent with a facsimile, and the time and transport cost required for sending the documents in sealed covers can be reduced.

According to another aspect of the invention, when a manuscript to which a predetermined mark is given is received, it can be distributed to the terminal device at the corresponding department according to the mark, that is, automatically the destination can be determined, thus job efficiency can be improved.

What is claimed is:

1. A facsimile apparatus comprising:
   first means for judging whether or not a predetermined recognition mark is given in a predetermined area of received manuscript data comprising a mark storage device for storing said predetermined recognition mark in advance, an area data storage device for storing said predetermined area of said received manuscript data, and a comparison device for comparing data in a specific area of said manuscript data matching the area stored in said area data storage device with any one of said recognition marks stored in said mark storage device;
   second means for judging whether or not said manuscript data is strictly confidential information when said predetermined recognition mark is recognized with said first means;
   third means for storing the manuscript data in a memory when said manuscript data is judged to be strictly confidential information with said second means, and for instructing said manuscript data stored in said memory to be printed only if a predetermined password code is entered; and
   fourth means for executing normal printing when said predetermined recognition mark is not recognized with said first means.

2. A controlling method for a facsimile apparatus comprising the steps of:
   storing in a memory predetermined recognition mark for indicating the presence of confidential information in a received manuscript;
   comparing a predetermined area of received manuscript data with the stored predetermined recognition mark;
   judging whether or not a predetermined recognition mark is given in the predetermined area of received manuscript data;
   judging whether or not said manuscript data is strictly confidential information when the predetermined recognition mark is recognized;
   storing the manuscript data in a memory when said manuscript data is judged to be strictly confidential information;
   instructing said manuscript data stored in said memory to be printed only if a predetermined password code is entered; and
   executing normal printing when said predetermined recognition mark is not recognized.

* * * * *

UNITED STATES PATENT AND TRADEMARK OFFICE
CERTIFICATE OF CORRECTION

PATENT NO. : 5,386,303

DATED : January 31, 1995

INVENTOR(S) : Kihara

It is certified that error appears in the above-indentified patent and that said Letters Patent is hereby corrected as shown below:

Column 1, line 21
"manuscript" should read --manuscript is--;

Column 1, lines 35-36
"transmission" should read --transmission of--;

Column 2, line 64
"16o" should read --16.--;

Column 3, line 9
"stored" should read --stored in--;

Column 3, line 10 "17"
should read --17 to--;

Column 3, line 31
"indicates" should read --indicates a--;

UNITED STATES PATENT AND TRADEMARK OFFICE
CERTIFICATE OF CORRECTION

PATENT NO. : 5,386,303

DATED : January 31, 1995

INVENTOR(S) : Kihara

It is certified that error appears in the above-indentified patent and that said Letters Patent is hereby corrected as shown below:

<u>Column 4, line 40</u>
"memory" should read --memory a--.

Signed and Sealed this

Twenty-third Day of May, 1995

BRUCE LEHMAN

Attest:

Attesting Officer

Commissioner of Patents and Trademarks